United States Patent [19]

Kii

[11] Patent Number: 5,016,095
[45] Date of Patent: May 14, 1991

[54] DIGITAL CONVERGENCE FOR TELEVISION RECEIVER

[75] Inventor: Kazuo Kii, Tokyo, Japan

[73] Assignee: Sony Corporation, Tokyo, Japan

[21] Appl. No.: 420,470

[22] Filed: Oct. 12, 1989

[30] Foreign Application Priority Data

Oct. 14, 1988 [JP] Japan ................................ 63-P259000

[51] Int. Cl.⁵ .......................... H04N 9/16; H04N 9/18
[52] U.S. Cl. ......................................... 358/64; 358/60; 315/368
[58] Field of Search ..................... 358/64, 60; 315/368

[56] References Cited

U.S. PATENT DOCUMENTS

| | | |
|---|---|---|
| 3,740,608 | 6/1973 | Manber et al. |
| 4,422,019 | 12/1983 | Meyer ................................ 315/368 |
| 4,672,275 | 6/1987 | Ando ..................................... 358/64 |
| 4,835,602 | 5/1989 | Duwaer ................................ 358/64 |
| 4,870,329 | 9/1989 | Ara ...................................... 315/368 |
| 4,871,948 | 10/1989 | Nelson ................................ 315/368 |

FOREIGN PATENT DOCUMENTS

| | | |
|---|---|---|
| 68420 | 1/1983 | European Pat. Off. . |
| 304991 | 3/1989 | European Pat. Off. . |
| 2126855 | 3/1984 | United Kingdom . |
| 2176679 | 12/1984 | United Kingdom . |
| 2166028 | 4/1986 | United Kingdom . |
| 2193068 | 1/1988 | United Kingdom . |

Primary Examiner—Howard W. Britton
Assistant Examiner—Michael H. Lee
Attorney, Agent, or Firm—Lewis H. Eslinger

[57] ABSTRACT

In correction waveform data generating apparatus for digital convergence or digital focusing in a color television receiver, the adjustment data for all adjustment points including the region of blanking intervals is controlled from the adjustment data for a relatively small number of representative adjustment points on the image screen. Data for the representative points is automatically interpolated to generate uniform correction waveform data for the entire image screen. Basic correction waveform data is stored for each representative adjustment point and is repeatedly added to and/or subtracted from on the basis of adjustment instructions at the respective adjustment points, so that data adjustment and waveform correction are achieved.

13 Claims, 13 Drawing Sheets

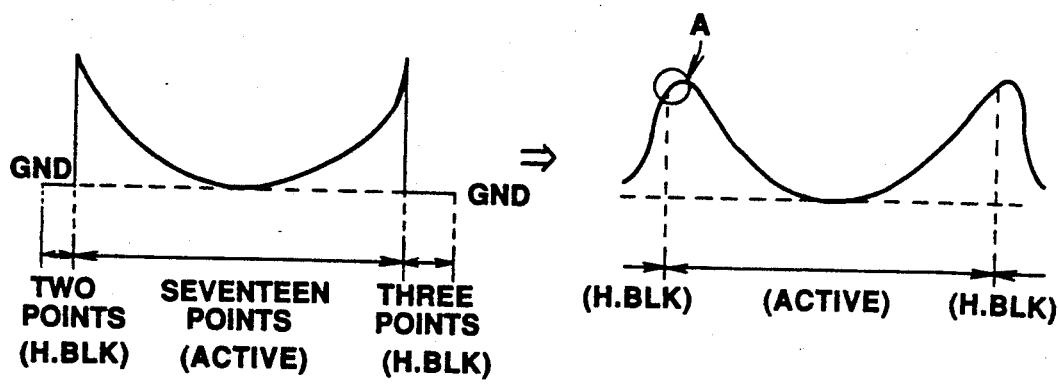
FIG. 2(a)
(PRIOR ART)
FIG. 2(b)
(PRIOR ART)
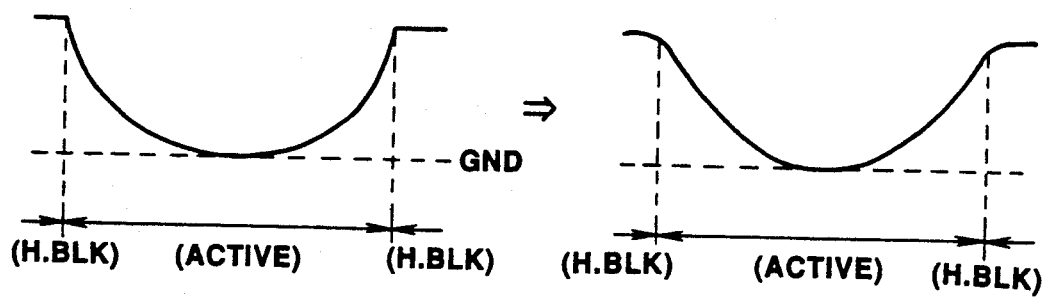
FIG. 3(a)
(PRIOR ART)
FIG. 3(b)
(PRIOR ART)
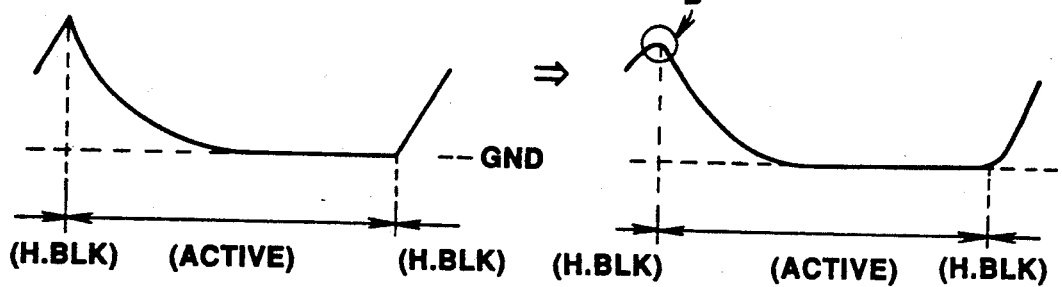
FIG. 4(a)
(PRIOR ART)
FIG. 4(b)
(PRIOR ART)

(HORIZONTAL PERIOD)

FIG.7(b) OUTPUT(A)

FIG.7(c) OUTPUT(B)

FIG.7(d) OUTPUT(C)

FIG.7(e) OUTPUT(C)

(VERTICAL PERIOD)

SHIFT + F1 , F2 , F3
       SAVE  RESET  CLEAR
FIG. 14 (a)
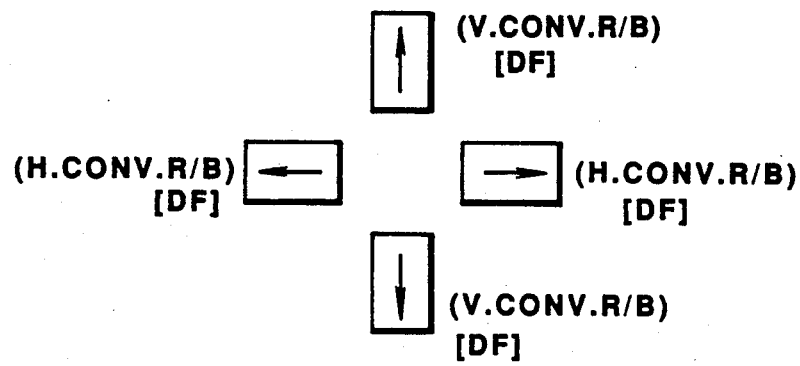
FIG. 14 (b)
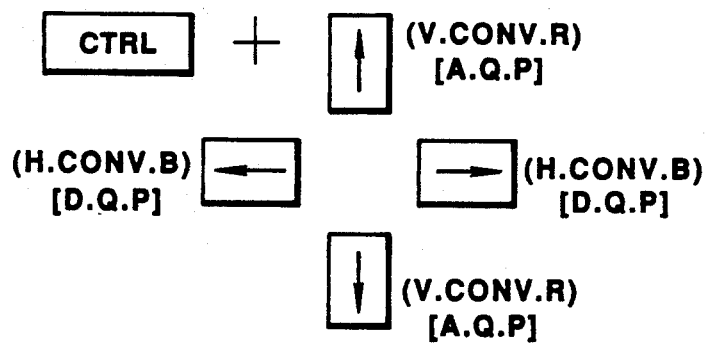
FIG. 14 (c)

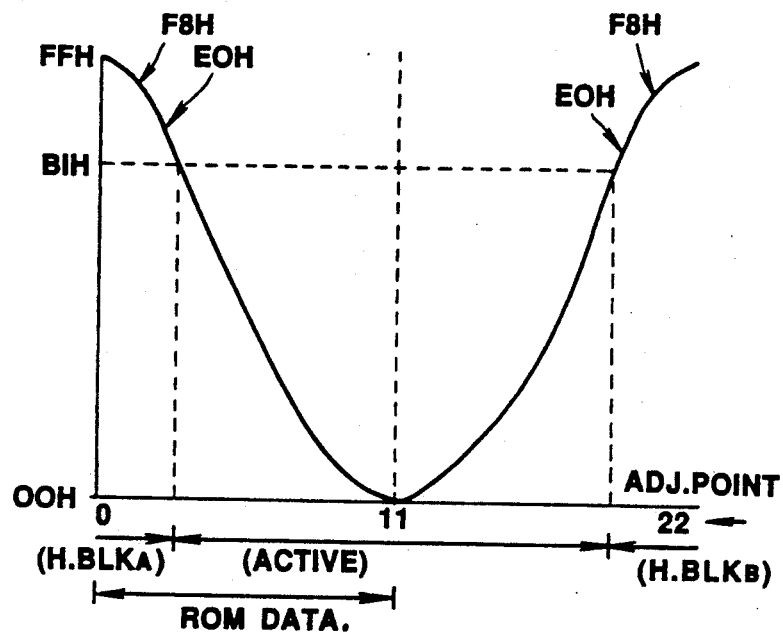
FIG. 15
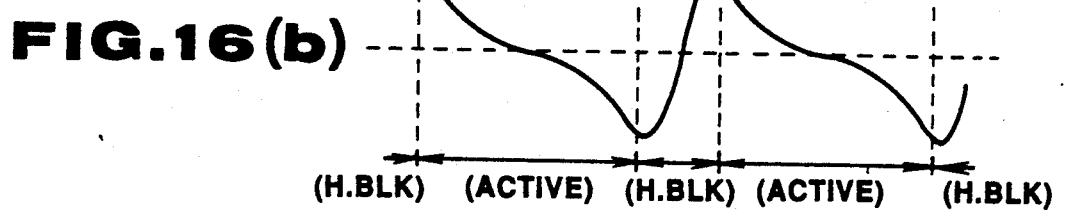

DIGITAL CONVERGENCE FOR TELEVISION RECEIVER

BACKGROUND OF THE INVENTION

1. Field of the Invention

The present invention relates generally to apparatus for generating correction waveform data for digital convergence, digital focus, and so on, for an image display unit such as a television receiver.

2. Description of the Prior Art

A previously proposed system for carrying out convergence and focus adjustments in a television receiver (often hereinafter referred to simply as a TV) freely adjusts the corrected waveforms to be applied to a convergence plate (or to a convergence coil) and to a correction waveform in a digital processing method.

FIGS. 1(a), 1(b), and 1(c) are explanatory views of the digital convergence adjustment of the corrected waveform effected by previously proposed digital convergence waveform data generating apparatus.

FIG. 1(a) shows a cross-hatch pattern indicating a plurality of adjustment points which are intersections of horizontal and vertical lines on an image screen of the TV 100.

FIG. 1(b) is an explanatory view of a fine adjustment carried out on one adjustment point, e.g., an origin $P_{o,o}$ shown in FIG. 1(a).

FIG. 1(c) is an explanatory view of a coarse adjustment carried out on one representative adjustment point, i.e., the origin shown in FIG. 1(b).

For the adjustment of the correction waveform of the convergence, a plurality (e.g., 17 points in the horizontal direction by 17 points in the vertical direction=289 points) of adjustment points $P_{i,j}$ are allocated in matrix form, as shown in FIG. 1(a). During initial stages of development, convergence correction waveform generating apparatus required so-called fine adjustment of each of the respective adjustment points (adjustment to a low tolerance or precise adjustment) as shown in FIG. 1(a) to be carried out; a great deal of time and effort were consumed because of the presence of a such large number of adjustment points. Individual correction waveforms after fine adjustment become discontinuous with each other; consequently, a totally smooth correction waveform cannot be obtained. When viewed externally, as by looking toward a screen on which the corrected image is displayed, the corrected waveforms become prominent. This a principal disadvantage of previously proposed systems.

To eliminate the disadvantage described above, another previously proposed correction waveform data generating apparatus provides several adjustment points that represent all of the adjustment points (so-called representative adjustment points) selected from among the total number of adjustment points. The representative adjustment points are placed at several points of intersection on the image screen.

Then, when adjustment data is supplied as an input to any one of the representative adjustment points, the adjustment data for the other adjustment points in the vicinity of the (selected) representative adjustment point is automatically interpolated, and a calculated processing for the correction waveform data is executed so as to produce a continuous change in the correction waveform. That is to say, the above-described processing for the correction waveform is executed by means of a coarse adjustment correction waveform data generating apparatus.

As FIGS. 1(a) through 1(c) show, the fine adjustment shown in FIG. 1(b) is such as to provide the adjustment data only for the adjustment point of origin, e.g., $P_{o,o}$ (origin) on the image screen 100a (FIG. 1(a) shows one quadrant). When fine adjustment is carried out on the origin only, adjustment data can become discontinuous.

On the other hand, in the coarse adjustment shown in FIG. 1(c), suppose that the horizontal axis on the image screen 100a is represented by x, the vertical axis is represented by y, and the adjustment data of the correction waveform is represented by an amplitude (depth) in the z direction. In the case of the coarse adjustment data for the image screen 100a shown in FIG. 1(a) where the coarse adjustment is carried out on one representative point, e.g., $P_{o,o}$, a series of calculations such as those expressed in the following equation (1) is carried out on all adjustment points (lattice intersections shown in FIG. 1(a)) that are in proximity to the representative adjustment point, i e., origin $$z = a\,(k-x)^2\,(k-y)^2 \quad \ldots (1)$$

where a is a factor and k is a constant. Therefore, adjustment data providing a smooth curved surface as shown in FIG. 1(c) can be achieved The adjustment data thus generated by the convergence correction waveform data generating apparatus described above is written into a random access memory (RAM). During operation of the image display unit, the written adjustment data is sequentially read in response to a clock synchronized with the horizontal and vertical scanning of the image display apparatus. In the process of D/A conversion, step-wise correction waveforms in the horizontal scanning interval are smoothed through a lowpass filter (LPF), and thereafter the smoothed waveform is applied to the convergence plate (or correction coil) so that convergence correction for the color television receiver is carried out.

As FIG. 2(a) shows, the corrected waveform of convergence is such that, from a ground state, it ideally assumes its peak value instantly without gradation, after which it gradually returns to the ground state again and then gradually once more returns to its peak value, the gradation from peak to peak describing a parabola that is concave up. After reaching the peak state that completes the parabola it ideally instantly assumes its ground value once again.

However, as the actual output correction waveform of FIG. 2(b) shows, in practice the ideal correction waveform represented by FIG. 2(a) is not attained. One scanning during the horizontal period in the case of image display is divided into a video display interval (active interval) and horizontal blanking interval (H. BLK). The previously proposed adjustment (interpolation) is carried out only during the active interval. During the horizontal blanking interval, the corrected waveform maintains its ground state (GND). However, the corrected waveform thus obtained is such that it is delayed by the influence of devices such as low-pass filters (e.g., at part A shown in FIG. 2(b)), and a rounded peak wave results. This is a hindrance to correction at the right and left edges of the image.

A previously proposed method of remedying problems such as those described above was a linear interpolation method carried out during the horizontal blanking interval as shown in FIGS. 3(a) and 3(b). FIG. 3(a)

is an ideal correction waveform in the case of the linear interpolation method and FIG. 3(b) is an actual output correction waveform This linear interpolation method is such that, as viewed from the initial data to final data of the active interval, a straight line is in effect drawn between the initial and last data during horizontal blanking.

However, the previously proposed correction waveform data generating apparatus described above presents the following problems:

(1) In the case of coarse adjustment, the adjustment data has been generated by means of calculation processing so as automatically to produce an optimum waveform for convergence correction at points in proximity to the representative adjustment point. However, a large amount of calculation processing time is required along with complex multiplication as shown in equation (1). Therefore, the response on the screen at the time of adjustment becomes delayed, operability becomes worse, and adjustment times also become lengthened. In usual practice, the calculation of the equation (1) is carried out using a central processing unit (CPU). To speed up the calculation processing time, a CPU having high performance and a self-contained calculation processor (a so-called coprocessor) may be used. However, the use of such processors entails high production costs.

(2) In methods using linear interpolation during the horizontal blanking interval, straight lines are used to connect the initial adjustment data and final adjustment data in the active interval when viewing the adjustment data so as to prevent delay and waveform rounding (caused for example by a low-pass filter (LPF)) from degrading the optimum waveform at the left and right edges of the screen. The technique of providing a straight connecting line is valid in cases where the change between the two points connected by the straight line is zero or very small. However, when the change becomes large, as illustrated in FIGS. 4(a) and 4(b), the above-described influences appear at point B of the actual correction waveform shown in FIG. 4(b), so that there is a discrepancy between the actual and ideal waveforms.

The prevention of such influences is not always possible. FIG. 4(a) shows the ideal correction waveform corresponding to deteriorated actual correction waveform shown in FIG. 4(b).

SUMMARY OF THE INVENTION

It is an object of the present invention to provide correction waveform data generating apparatus for an image display wherein waveform corrections for convergence, focusing, and so on are achieved by means of digital adjustment.

Another object of the invention is to provide correction waveform data generating apparatus that is capable of operating at very high speed.

Another object of the invention is to provide correction waveform data generating apparatus wherein readout of data applicable to one quadrant of a display can be made applicable to the other three quadrants of the display by varying the sequence of readout.

Another object of the invention is to provide correction waveform data generating apparatus wherein addition is substituted for multiplication in the calculation of correction data, thereby speeding up the numerical processing of data.

The foregoing and other objects of the invention are attained in a first aspect thereof by the provision of apparatus for generating correction waveform data for an image display, comprising: a memory storing previously calculated basic correction waveform data for each of a plurality of representative adjustment points of the image display and for adjustment points respectively adjacent to the representative adjustment points; and calculation processing means for adding or subtracting to or from the basic correction waveform data at all of the adjustment points including the representative adjustment points on the basis of the adjustment instructions pertaining to the respective representative adjustment points, thereby generating correction waveform data for use in forming the image display.

In accordance with an independent aspect of the invention, there is provided apparatus for generating correction waveform data for digital convergence correction in a color television receiver, comprising: a commander for issuing commands selectively specifying adjustment items, moving one of representative adjustment points selected from a multiplicity of adjustment points on an image screen of the television receiver, or increasing or decreasing adjustment data determining the amplitude of a correction waveform at the representative adjustment points; a processing unit for repeatedly carrying out additions and subtractions for effecting waveform correction with respect to the representative adjustment points and other adjustment points respectively adjacent thereto as a unit in response to the commands and finally for generating correction waveform data with respect to remaining ones of the adjustment points; and memory means for storing basic waveform data relating to the representative adjustment points and the adjustment points respectively adjacent thereto, the basic waveform data being previously calculated using a predetermined equation.

In accordance with another independent aspect of the invention, there is provided a method of generating correction waveform data for an image display having an active interval and a blanking interval, comprising the steps of: storing previously calculated basic correction waveform data for each of a plurality of representative points of the image display and for adjustment points respectively adjacent to said representative adjustment points; adding or subtracting to or from the basic correction waveform data at all of the adjustment points including the representative adjustment points on the basis of adjustment instructions pertaining to the respective representative adjustment points, thereby generating correction waveform data for use in forming the image display; using the correction waveform data to adjust all of the adjustment points except the representative adjustment points during the blanking interval; storing the basic correction waveform data of the adjustment points during the blanking interval; and preparing updated correction waveform data during the blanking interval.

BRIEF DESCRIPTION OF THE DRAWINGS

FIGS. 2(a) and 2(b) are respectively ideal and actual waveform charts of corrected waveforms in a previously proposed correction waveform generating apparatus.

FIGS. 3(a) and 3(b) and FIGS. 4(a) and 4(b) are explanatory views of linear interpolations carried out in the previously proposed correction waveform generating apparatus during a horizontal blanking interval.

FIGS. 7(a) through 7(e) are waveforms charts of the digital convergence correction circuit shown in FIG. 6.

FIGS. 14(a) and 14(c) are explanatory views of a series of operations for a commander 2 shown in FIG. 5.

FIG. 15 is an explanatory view of a second preferred embodiment of the correction waveform generating apparatus according to the present invention.

FIGS. 16(a) and 16(b) are waveform charts for explaining the operation of the second preferred embodiment.

DESCRIPTION OF THE PREFERRED EMBODIMENTS

Reference will hereinafter be made to the drawings in order to facilitate a better understanding of the present invention.

Figure 1A:
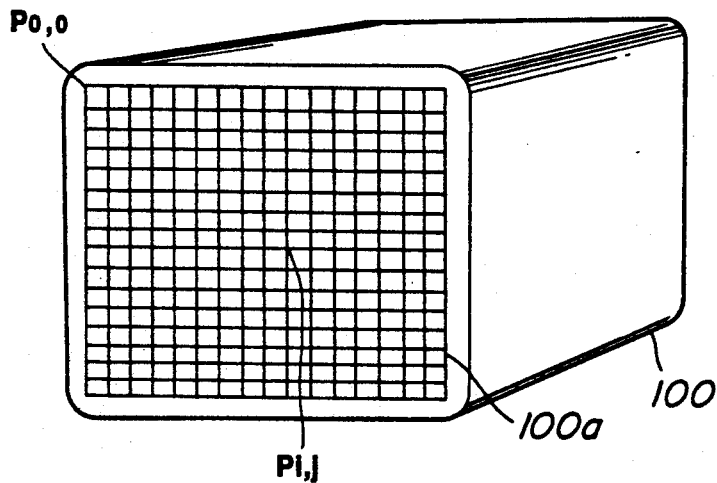
FIGS. 1(a) through 1(c) are explanatory views of a digital convergence adjustment of a corrected waveform effected by previously proposed digital convergence waveform data generating apparatus.
Figure 1B:
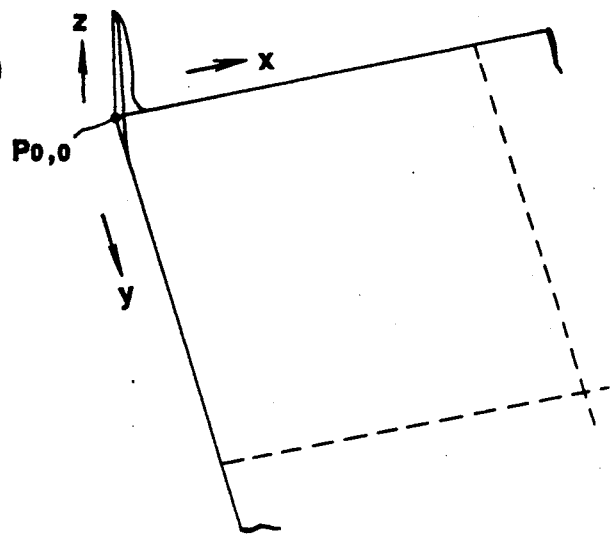
Figure 1C:
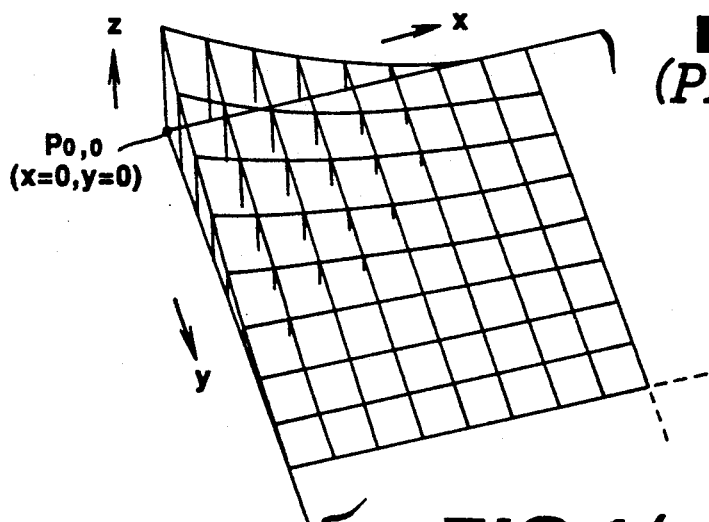
Figure 5:
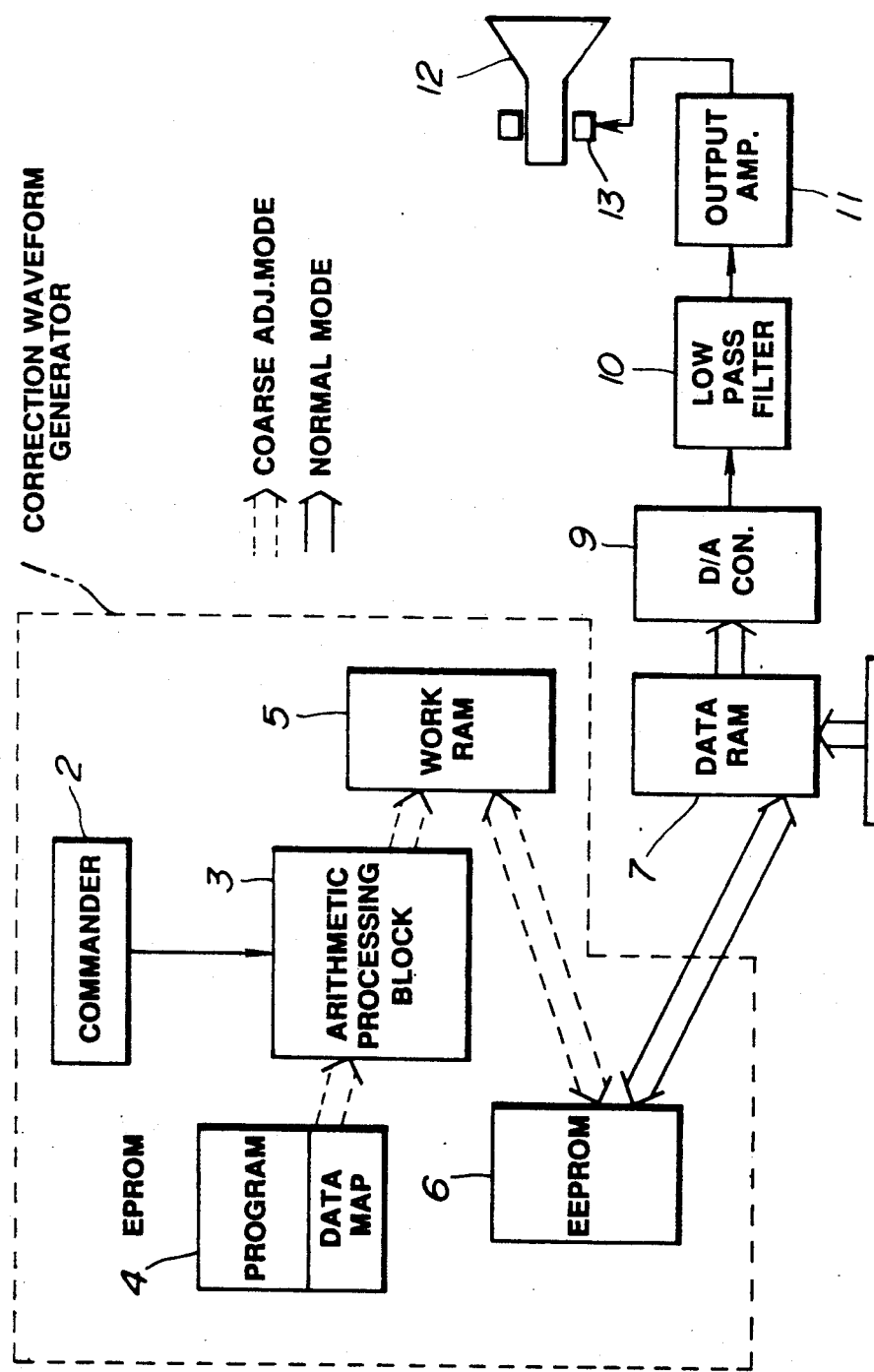
FIG. 5 is a circuit block diagram of a first preferred embodiment of a correction waveform generating apparatus and digital convergence correction circuit according to the present invention.

FIG. 5 is a circuit block diagram of a first preferred embodiment of a correction waveform data generating apparatus according to the present invention.

In the first preferred embodiment, the correction waveform data generating apparatus according to the present invention is applicable to a digital convergence correction circuit. In FIG. 5 data transmission between components in the coarse adjustment mode is indicated by arrows with hollow shafts formed of broken lines and in the normal mode by arrows with hollow shafts formed of solid lines.

The correction waveform data generating apparatus 1 for the digital convergence in the first preferred embodiment comprises a commander 2 for allowing an operator to input various commands of adjustment at a representative adjustment point (to be described later), an arithmetic processing block or operating unit 3 for generating correction waveform data according to commands derived from the commander 2, an erasable programmable read only memory (EPROM) 4 for storing basic correction waveform data (hereinafter referred to as a data map) used by the program in the arithmetic processing unit 3, a work random access memory (work RAM) 5 for temporarily storing the arithmetic processing results, and an electrically erasable and programmable ROM (EEPROM) 6 employed as an electrically rewritable backup.

A central processing unit (CPU), etc., may be used as the arithmetic operating unit 3 and is connected to the commander 2 via an interface such as an RS422A. The commander 2 transmits commands in order, for example, to communicate the adjustment items, to move the representative adjustment point on the screen, and to increase or decrease an amplitude value of the corrected waveform at the representative adjustment point. The arithmetic operating unit 3 repeatedly carries out addition and substraction operations on the representative adjustment point and its proximate points with basic correction waveform data to increase or decrease the amplitude value thereof while the adjustment command is being issued from the commander 2.

Finally, the data for generating the correction waveform for all adjustment points is prepared. The basic correction waveform data is previously calculated and stored using a calculation equation. The work RAM 5 stores data on the representative adjustment points and points proximate thereto. The correction waveform data generating apparatus 1 described above can be applied in common with another correction circuit such as a digital focusing circuit.

The parts of the digital convergence correction circuit, which cooperates with the correction waveform data generating apparatus 1, are also shown in FIG. 5.

When its power supply is turned on, a data RAM 7 stores the correction waveform data obtained in the way described above and transferred from the work RAM 5 during the adjustment mode and from the EEPROM 6 during the normal mode. A counter 8 reads the correction waveform data from the work RAM (or EEPROM 6) into the data RAM 7 in synchronization with the horizontal/vertical synchronization signal. A digital/analog (D/A) converter 9 carries out the analog conversion of the read correction waveform data to provide a stepped waveform (normally, the convergence correction waveform has a parabolic shape). A low pass filter (LPF) 10 smoothes the stepwise waveform, and an output amplifier 11 amplifies the smoothed waveform.

The smoothed correction waveform output from the output amplifier 11 is finally applied to a convergence plate or convergence yoke 13. It is noted that the data RAM 7, D/A converter 9, LPF 10, and output amplifier 11 are individually installed for each adjustment item. The adjustment items include horizontal convergence red/blue (H. CONV. R/B), horizontal convergence blue (H. CONV. B), vertical convergence red/blue (V. CONV. R/B), a dynamic focus (DF), an axial quadrupole (AQP), and a diagonal quadrupole (DQP).

Figure 6:
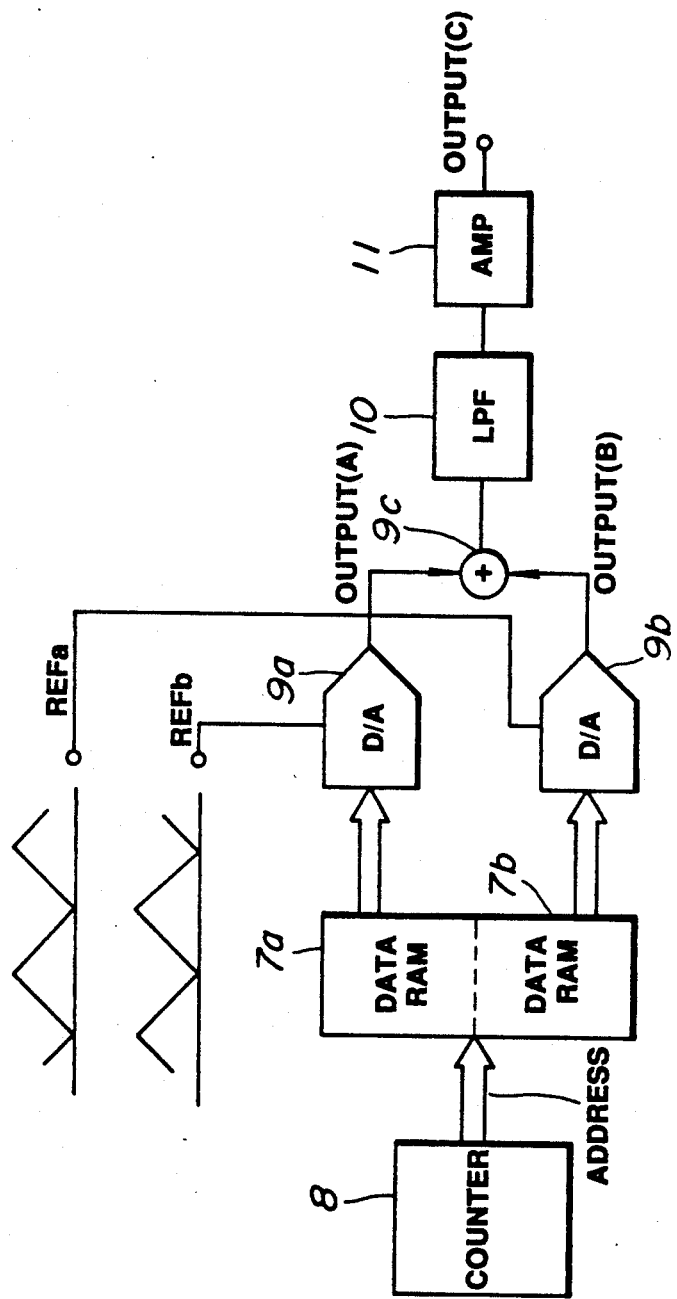
FIG. 6 is a circuit block diagram of an example of a digital convergence correction circuit.

FIG. 6 is a circuit block diagram of a specific example of the digital convergence correction circuit shown in FIG. 5.

FIGS. 7(a) through 7(e) are waveform charts for explaining the operation of the digital convergence correction circuit.

The data RAM 7 shown as a whole in FIG. 5 is constituted by two data RAMs 7a, 7b shown in FIG. 6, the same correction waveform data being written into the same address of each data RAM 7a and 7b.

The correction waveform data stored in both data RAMs 7a, 7b are read alternatingly in such a way that the data on the different lines are alternatingly read according to addresses provided from the counter 8. The read data is supplied to the D/A converters 9a and 9b. These D/A converters 9a, 9b receive the triangular reference voltages REFa, REFb which are out of phase with respect to each other by 180°. The intervals of each apex of triangular corrugation present in the reference voltages REFa and REFb are set so as to become equal to one horizontal line interval having adjustment points, the phase relationship between the two reference voltages REFa and REFb being such that one of the reference voltages becomes increased and the other becomes decreased.

As described above, linear interpolation is carried out for adjusting horizontal lines having no adjustment points on the basis of the correction waveform data of adjacent horizontal lines having adjustment points.

The operation of the digital convergence correction circuit shown in FIG. 6 is described below with reference to the waveform charts shown in FIGS. 7(a), 7(b), 7(c), 7(d), and 7(e).

In the preferred embodiment, there is an interval of four lines between horizontal lines having adjustment points.

Figure 7A:
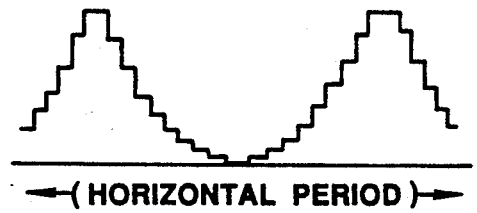
Figure 7A:
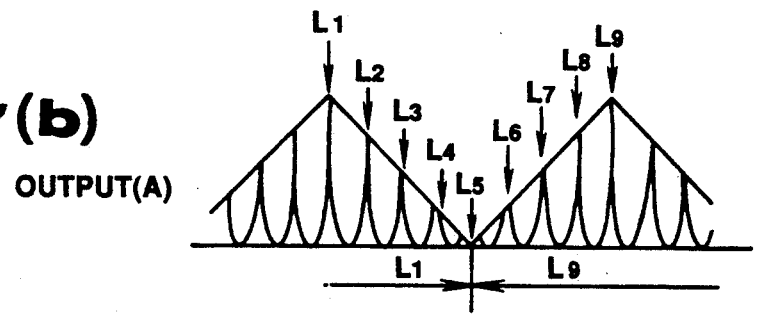
Figure 7A:
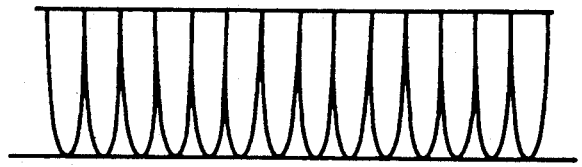
Figure 7A:
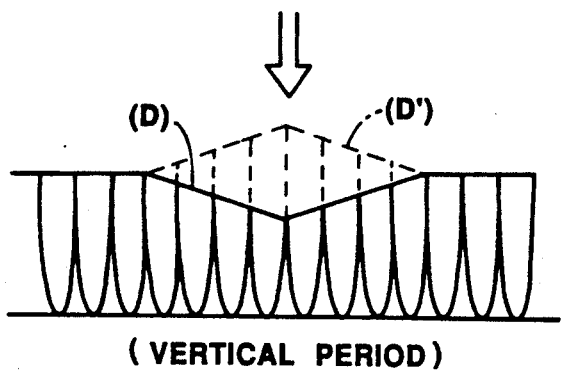

FIG. 7(a) shows a one line D/A converted waveform from which a stepped parabolic waveform results.

FIG. 7(b) shows a waveform output (A) of the D/A converter 9a.

FIG. 7(c) shows a waveform output (B) of the D/A converter 9b.

FIG. 7(d) shows waveform output (C) of the amplifier 11.

FIG. 7(e) shows the pattern of movement of output (C) due to a particular adjustment.

The maximum point of output (A) shown in FIG. 7(b) is the output of a line $L_1$ having adjustment points. The minimum point of output (A), also shown in FIG. 7(b), is output of line $L_5$, which is the next line after line $L_1$ in the period of four lines that has adjustment points. The correction waveform data of the line $L_1$ is repeatedly output from the data RAM 7a in synchronization with the horizontal period, while the correction waveform data of the line $L_5$ is repeatedly output from the data RAM 7b. Hence, the correction waveform data for the lines $L_2$ through $L_4$, which have no adjustment points, is based on the correction waveform data from lines $L_1$ and $L_5$, mixed in accordance with an appropriate linear percentage. For the output of the corrected waveforms from line $L_5$ to line $L_9$, the corrected waveform data of the line $L_9$ is repeatedly output from the data RAM 7a, while the corrected waveform data for line $L_5$ is still being output from the data RAM 7b, so that the lines $L_6$ through $L_8$ are subjected to linear interpolation as described above for lines $L_2$ to $L_4$.

During the repeated output of the lines $L_1$ and $L_5$, the output voltage of output (A) is decreased according to a decrease in the triangular reference voltage REFa; and during the output of lines $L_5$ and $L_9$, the output voltage of output (A) is increased according to the reference voltage REFa. Concurrently, the output voltage of output (B) is increased during a decrease in output (A) and decreased during an increase in output (A), since the triangular reference voltage REFb is 180° out of phase with voltage REFa.

Outputs (A) and (B) are combined at mixing circuit 9c of the D/A converter 9 and supplied to the low pass filter 10 and amplifier 11, the amplifier 11 supplying the output (C). The output (C), shown in FIG. 7 (e), is moved in a range as shown in envelopes (D) and (D') according to fine adjustment processing (normal mode =fine adjustment).

Next, the construction of the data map is described.

Figure 8A:
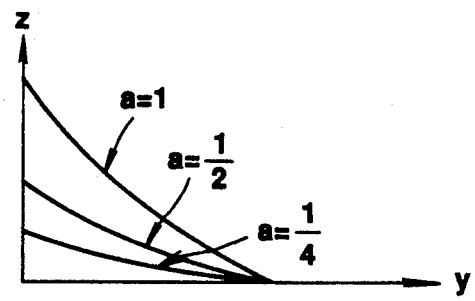
FIGS. 8(a) through 8(c) are explanatory views of a data map configuration.
Figure 8B:
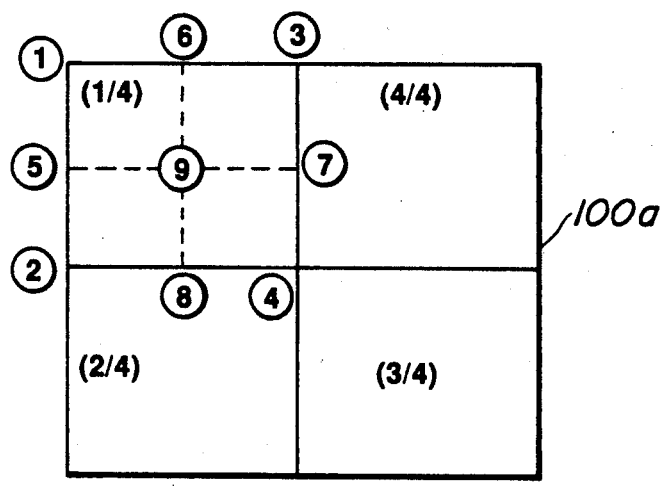
Figure 8C:
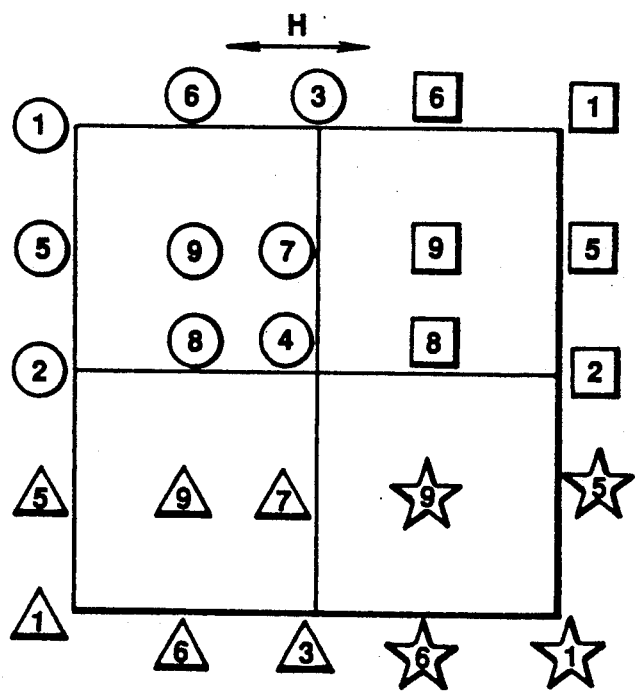
Figure 9C:
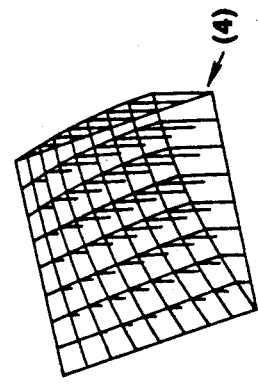
FIGS. 9(a) through 9(i) are explanatory views of data structures of a data map.
Figure 9G:
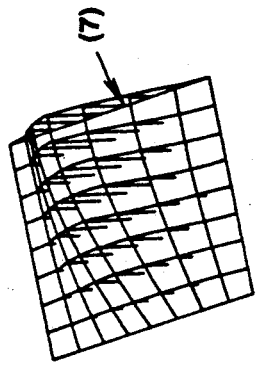
Figure 9D:
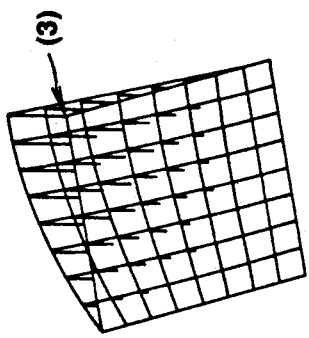
Figure 9F:
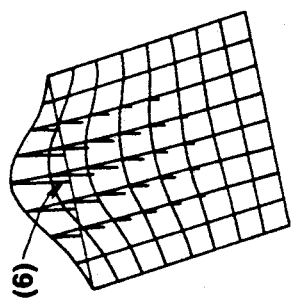
Figure 9I:
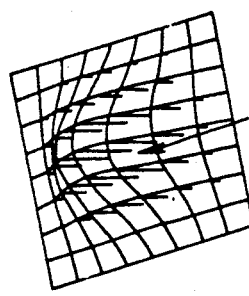
Figure 9H:
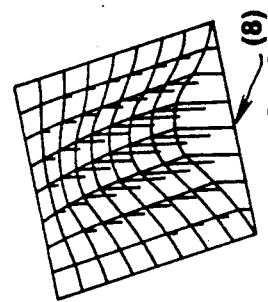
Figure 9A:
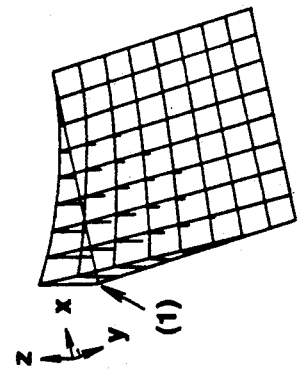
Figure 9E:
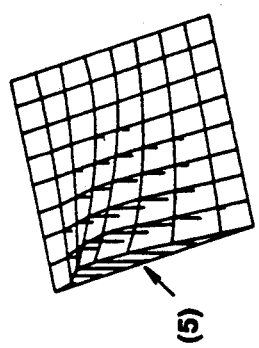
Figure 9B:
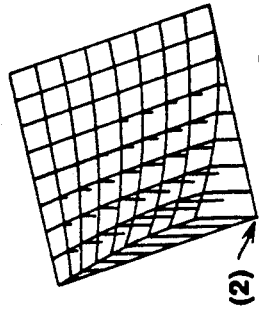
Figure 10A:
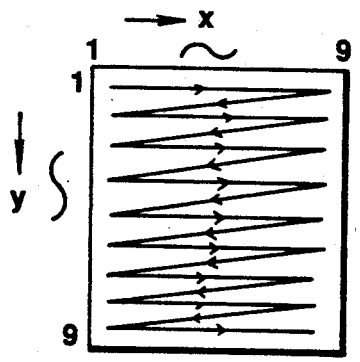
FIGS. 10(a) through 10(d) are explanatory views of procedures for reading the data map stored in EPROM 4 shown in FIG. 5.
Figure 10B:
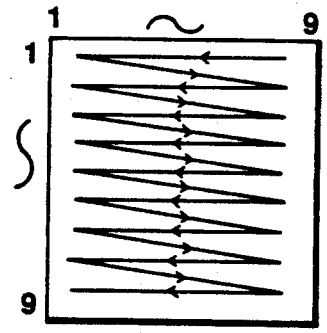
Figure 10C:
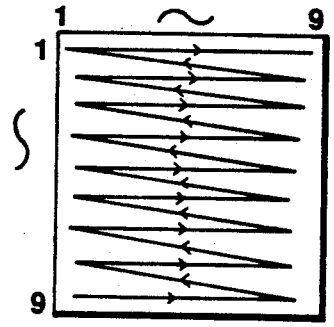
Figure 10D:
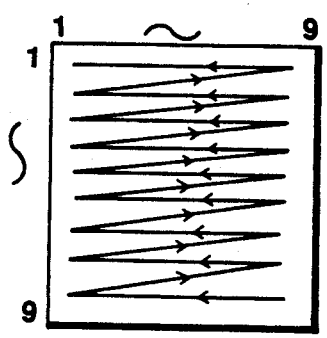

FIGS. 8(a) through 8(c) are explanatory views of the structure of a data map.

FIG. 8(a) is an explanatory view illustrating the arithmetic operation processing as viewed in the x direction (i.e., in the direction of the horizontal axis of the image screen).

FIG. 8(b) is an explanatory view of representative adjustment points at the time of coarse adjustments in quadrant ¼ of the image screen.

FIG. 8(c) is an explanatory view of the image screen when the data map is utilized.

FIGS. 9(a) through 9(i) are explanatory views of the data structures on the data map.

The adjustment points on the screen are allocated over the area of the display screen in matrix form, with, for example, 17×17 (total 289) points for each adjustment item. When a matrix of, for example, 5×5 (total 25) points are utilized as the representative adjustment points, digital adjustments, i.e., coarse adjustments, are carried out so as automatically to achieve a smooth corrected waveform for all adjustment points affected by the coarse adjustment, i.e., points other than the representative adjustment points.

Suppose that the horizontal axis is x, the vertical axis is y, and the amplitude of the corrected waveform data (depth) is z, as described in the BACKGROUND OF THE INVENTION. The correction waveform data for the respective adjustment points may be updated in the vicinity of the image screen corner through the above-described equation (1) (i.e., $z = a(k-x)^2(k-y)^2$. However, the processing of equation (1) puts a heavy burden on the system CPU and long time intervals for processing are required. In the preferred embodiment, in order to avoid such complex calculation processing, basic correction waveform data with previously calculated results is stored in the EPROM 4 as a data map, and the stored data is added/subtracted according to the adjustment instructions to achieve the adjusted corrected waveform data.

In detail, equation (1) is modified into the following two equations:

$$z' = (k-x)^2 (k-y)^2 \quad \ldots (2)$$

$$z = az' \quad \ldots (3)$$

The results of equation (2) are previously stored as a data map, and the correction waveform data is achieved through the calculation of only equation (3). In summary, the factor a in equation (3) is changed to provide the correction waveform data as shown in FIG. 8(a). Since, however, multiplication is included in equation (3), a relatively long calculation time is still required. Therefore, in the preferred embodiment, when the length of the data (z) at the corresponding adjustment point is, for example, eight bits, it is expanded to a length which is twice as long as the length of the data (z') on the data map (for example, to 16 bits) as the basic unit, and thereafter addition (when an instruction to make an incremental adjustment is present) or subtraction (when an instrument to make a decremental adjustment is present)—i.e., algebraic addition—is carried out so that the calculation result is tantamount to a multiplication by factor a.

For example, consider the following Fourier expansion: $b/2 \pm b/4 \pm b/8 \ldots$ ($b = 1$ or 0). By means of this expansion, ¾, for example, can be calculated as ½+¼; and ⅜, for example, can be calculated as ½−⅛. The value of $z'$ is quickly calculated in binary form by shifting the digits one place to the right. Similarly, a shift two places to the right is tantamount to division by four, and a shift three places to the right tantamount to division by eight. By performing appropriate shifts, partial sums are obtained which are than added to obtain a sum which is tantamount to multiplication of $z'$ by a to obtain $z$.

After calculation, the results are applied to the effective data length (e.g. 8 bits) and stored in memory. It will be noted that the ×2 data length calculations are not stored in memory. Such a method as described above has advantages in that the processing time becomes shorter since the simple arithmetic operations of addition or subtraction can be used even for complex calculation processing in order to achieve the optimum correction waveform. In addition, since the results of the calculations are reduced to the effective data length before storage, a so-called rounding error when the addition and/or subtraction is repeated does not result. That is to say, since the calculation processing is carried out by a data length twice as long as the effective data length, the accuracy of the calculation can be assured.

The data map described above indicates data resulting from processing of equation (2) which provides the basic unit of the addition/subtraction calculations and which has previously been stored in memory.

If the number of the representative adjustment points for coarse adjustment is 5×5 points (total of 25), for example, and the number of the adjustment points to be adjusted is 17×17 (=289) for one image screen, a memory having a capacity of 17×17×25=7225 bytes is required to process the 25 representative adjustment points. In order to reduce the memory capacity, in the preferred embodiment, the image screen 100$a$ is divided into four quadrants as shown in FIG. 8($b$), and the memory stores a data map corresponding to only a quarter (i.e., one quadrant) of the divided screen.

If the number of representative adjustment points in quadrant ¼ is, for example, 3×3=9, as denoted by (1) through (9) shown in FIG. 8($b$), the number of adjustment points (including interpolated adjustment points) is 9×9 points (=81). Data maps based on the respective representative adjustment points (1) through (9) shown in FIG. 8 ($b$) are shown diagrammatically in FIGS. 9($a$) though 9($i$).

Referring to FIGS. 8 and 9, suppose that the dynamic range is 8 bits (i.e., maximum data is supposed to be $2^8-1$) and that data $z$ in the depth direction, stored in the EPROM 4, corresponds to 9×9 adjustment points. Data maps for the remaining screen quadrants 2/4 through 4/4 are derived from the data maps of quadrant ¼ so that, in the case of quadrant 2/4, the data map of quadrant ¼ is inverted or flipped in the V direction, in the case of quadrant 4/4, the data map is inverted in the H direction, and in the case of quadrant 3/4, the data map is inverted in the H direction and the V direction. The memory capacity required for the data map is 9×9×9=729 bytes, which is about 1/10 the memory capacity necessary in a case where one data map for the entire screen (7225 bytes as described above) is provided.

FIGS. 10($a$) through 10($d$) are explanatory views of methods of specifically reading the data maps stored in the EPROM 4 shown in FIG. 5

The addresses in the work RAM 5 are always increased in the case of coarse adjustment. However, in order to effect the inversion or flipping described above, the addresses of the EPROM 4 are called out according to quadrant position as follows:

In the case of quadrant ¼ in FIG. 10($a$), the reading is carried out in such a way as to start from x=1 in the direction of x=9 and sequentially scan the quadrant from y=1 to y=9. In the case of quadrant 4/4 in FIG. 10($b$), the reading is carried out in such a way as to read from x=9 to x=1 and from y=1 to y=9. In the case of quadrant 2/4 shown in FIG. 10 ($c$), the reading is carried out in such a way as to read from x=1 to x=9, and from y=9 to y=1. In the case of quadrant 3/4 shown in FIG. 9($d$), the reading is carried out in such a way as to read from x=9 to x=1 and from y=9 to y=1.

It is noted that in the case of the representative adjustment point denoted by the numeral 8 in FIG. 8($c$) which is used in two quadrants, the reading methods shown in FIGS. 10($a$) and 10($c$) are used. It is also noted that in the case of the representative adjustment point denoted by the numeral 4 in FIG. 8($c$) which is used in all of the data maps extended over all four quadrants, the reading methods shown in FIGS. 10($a$) through 10($d$) are used.

Figure 11:
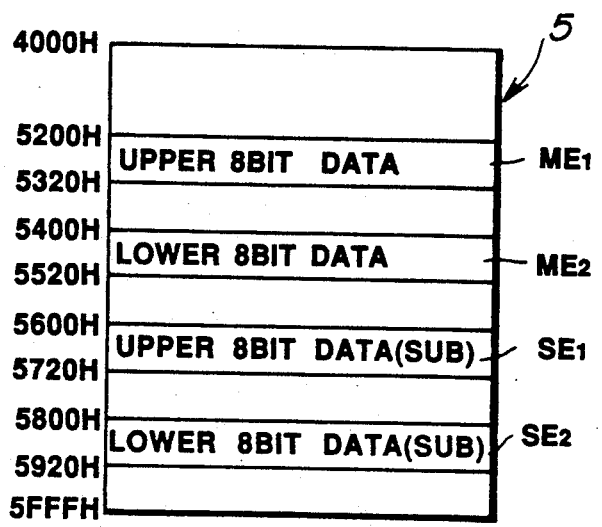
FIG. 11 is an explanatory view of a memory area in work RAM 5 shown in FIG. 5.

The memory structure of the work RAM 5 is described below with reference to FIG. 11.

The work RAM 5 is provided with a main area ($5200_H$ to $5320_H$) ME$_1$ for the upper 8 bit data, a main area ($5400_H$ to $5520_H$) ME$_2$ for the lower 8 bit data, a sub area ($5600_H$ to $5720_H$) SE$_1$ for the upper 8 bit data, and a sub area ($5800_H$ to $5920_H$) SE$_2$ for the lower 8 bit data.

In the coarse adjustment mode, the necessary data on the adjustment points is transferred from the EPROM 6 in FIG. 5 to main areas ME$_1$ and ME$_2$. When an increase or decrease instruction is issued and received, the CPU adds or subtracts a value allocated from the data map to or from the main area ME$_2$ for the lower 8 bit data during the receipt of the instruction described above. A value in the main area ME$_1$ of the corresponding upper 8 bit data is transferred to the data RAM 7 during the horizontal blanking interval by means of interrupt processing. The data in the main areas ME$_1$ and ME$_2$ is copied into the sub areas SE$_1$ and SE$_2$ so that the sub areas serve as backup memories.

Figure 12A:
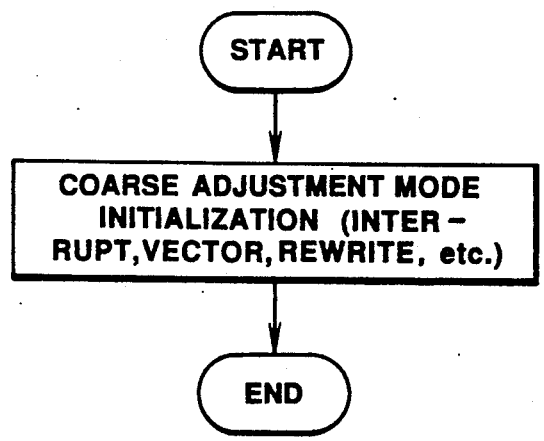
FIGS. 12(a) through 12(f) are operational flowcharts for explaining operation of the first preferred embodiment shown in FIG. 5.
Figure 12B:
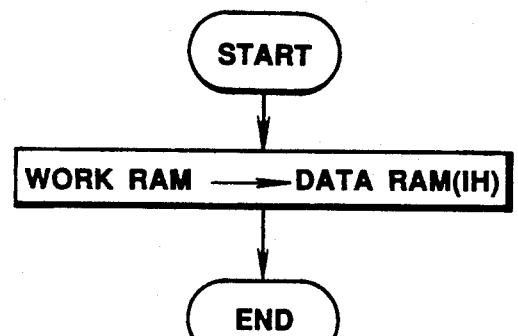
Figure 12C:
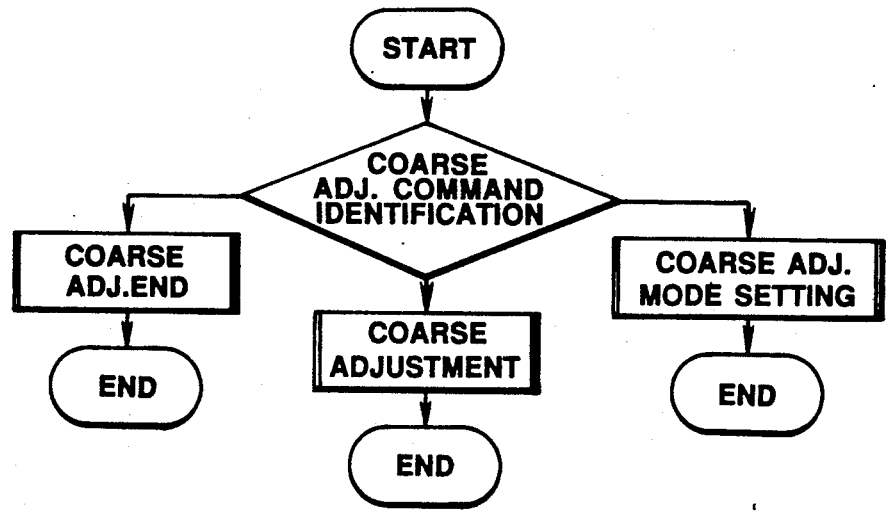
Figure 12:
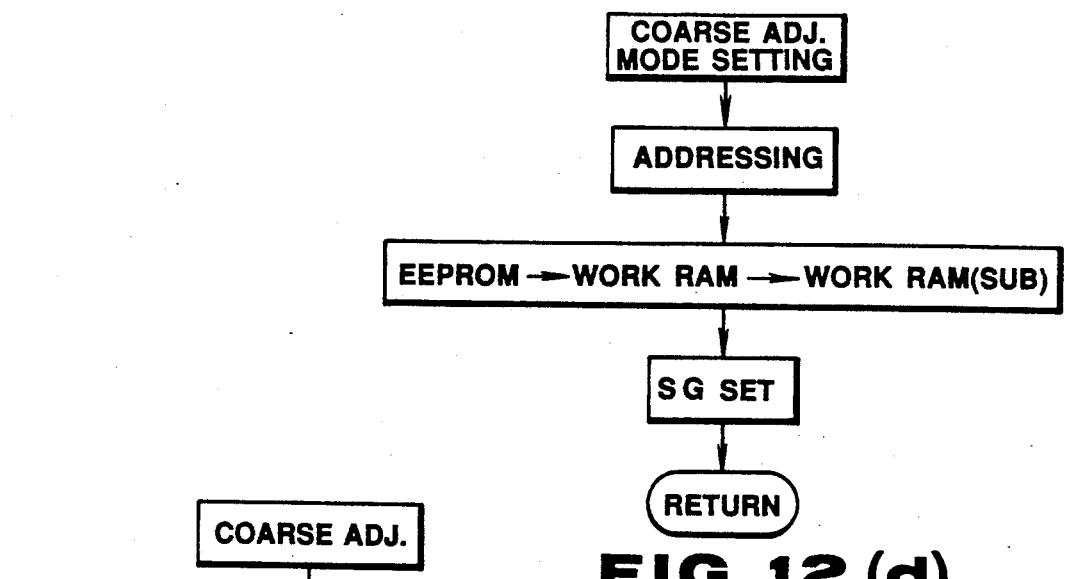
Figure 12:
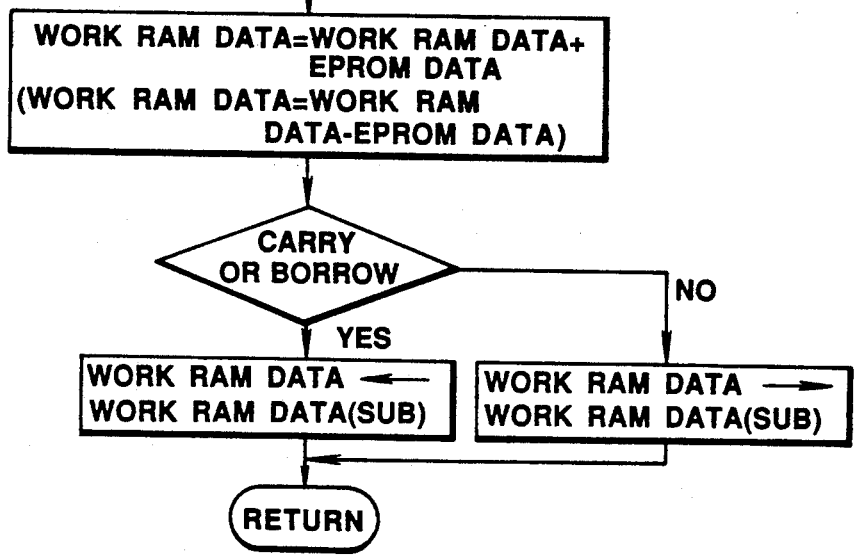
Figure 12:
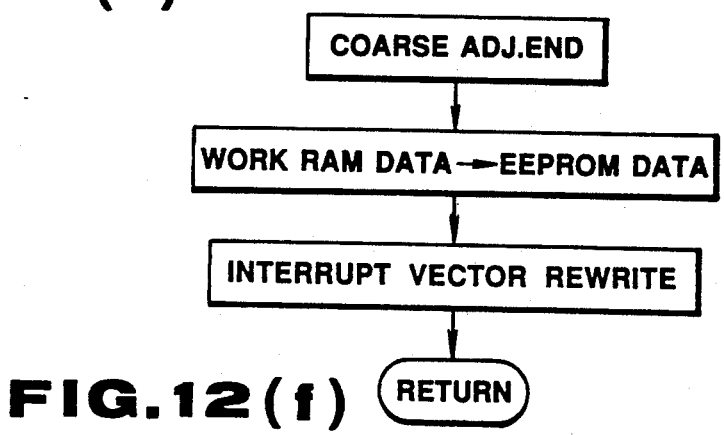

FIGS. 12($a$) through 12($f$) are flowcharts explaining operations of the preferred embodiment of the present invention.

FIG. 12($a$) is a flowchart illustrating the setting of the coarse adjustment mode. When the CPU enters the coarse adjustment mode according to its instructions, such processing as the rewrite of an interrupt vector and various initializations (refreshing) of the work RAM 5 are carried out.

FIG. 12($b$) is a flowchart illustrating the routine for data transfer to the data RAM 7. The interrupt processing during the vertical blanking interval V. BLK causes the corrected waveform data of the upper 8 bits for, e.g., IH (horizontal line) generated in the main area ME$_1$ of the RAM 5 to be transferred to the data RAM 7.

FIG. 12($c$) is a flowchart illustrating a coarse adjustment routine in which a coarse adjustment command issued from the external commander 2 is identified and the CPU sets the coarse adjustment mode shown in FIG. 12($d$) according to the contents of the instructions, in order to carry out coarse adjustment as shown in FIG. 12($e$) or in order to end processing for coarse adjustment as shown in FIG. 12($f$).

In the case of setting the coarse adjustment mode shown in FIG. 12($d$), the addresses from the EPROM 4 are set in order to select the data maps from the data RAM 7 and EEPROM 6 according to the addresses and adjustment points of the adjustment items (H. CONV. R/B, D/F, and so on).

Thereafter, the present correction waveform data (e.g., 16 bits) is transferred from the EEPROM 6 to the main areas $ME_1$ and $ME_2$ of the work RAM 5 and to the sub areas $SE_1$ and $SE_2$ of the work RAM 5 for backup purposes. Thereafter, the identification routine for the coarse adjustment command causes the setting of a signal generator that generates an image pattern appropriate to the adjustment items (a crosshatch, all white, all black, or all dots). The coarse adjustment routine shown in FIG. 12(e) carries out the addition or subtraction of the data map in the EPROM 4 to or from the data in the main areas $ME_1$ and $ME_2$ of the work RAM 5 upon receipt of the indication of adjustment and the command to increment or decrement the adjustment data from the commander 2. If, as the result of adjustment, a carry or borrow (the upper 8 bit data is changed from FFH to OH or from OH to FFH) is generated in the data of the work RAM 5, the adjustment processing is immediately ended. The data from the previous adjustment stored in the sub areas $SE_1$ and $SE_2$ is instead written into the main areas $ME_1$ and $ME_2$. If neither carry nor borrow is generated during an adjustment operation, the result of the current adjustment is copied into the sub areas $SE_1$ and $SE_2$ to be used as backup data in the case that a carry or borrow value is generated in the main memory areas $ME_1$ or $ME_2$ during the next occurrence of processing. In the case of the coarse adjustment end processing shown in FIG. 12(f), the coarse adjustment command from the commander 2 issued at the end of adjustment causes the data from the main areas $ME_1$ and $ME_2$ of the work RAM 5 to be dumped into the EEPROM 6 so that the interrupt vector is rewritten in order to end the interrupt processing which activates the transfer routine.

Figure 13:
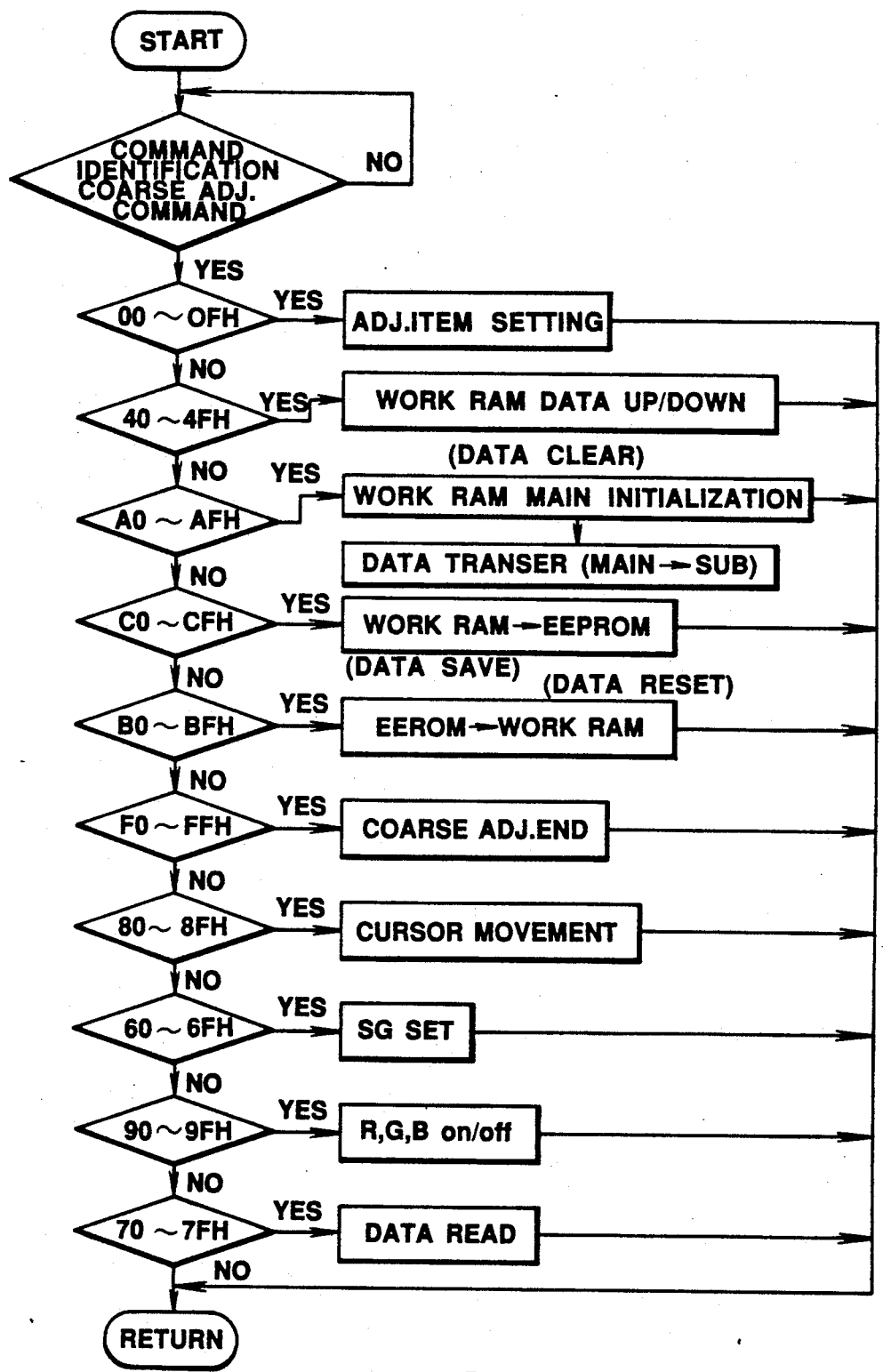
FIG. 13 is an operational flowchart of an identification routine for coarse adjustment commands.

FIG. 13 is a flowchart of the identification routine for the coarse adjustment commands.

This routine is activated as required during the processing shown in FIGS. 12(a) through 12(f). The commands issued from the commander 2 are identified by means of a code and provide various indications. That is to say, commands OOH through OFH mean setting of adjustment items; commands 40 through 4FH means UP/DOWN of adjustment data; commands AO through 4FH mean clearing of the data in the work RAM 5; commands CO through CFH mean dumping the data from the work RAM to the EEPROM 6; commands BO through BFH mean transfer (data reset) of data from the EEPROM 6 to the work RAM 5; commands FO through FFH mean end coarse adjustment; commands 80 through 8FH mean the movement of one representative adjustment point (cursor); commands 60 through 6FH means set SG (Signal Generator); commands 90 through 9FH mean on/off of the color signal display; and commands 70 through 7FH mean reading of the adjustment data to transfer the read adjustment data to the commander 2.

FIGS. 14(a) through 14(c) show operating procedures of the commander 2 and examples for carrying out commands of the coarse adjustment command using operation keys such as those provided on a personal computer. As FIG. 14(a) shows, the data commands of save, reset, and clear are provided when depressing simultaneously the corresponding function keys $F_1$, $F_2$, and $F_3$ and shift key. In addition, the indication of data UP/DOWN is carried out using the cursor key as shown in FIGS. 14(b) and 14(c). Symbols enclosed within parenthesis () show the case of convergence correction, and those enclosed within square brackets [] show focus correction. In a case where the CTRL key (control key) is not depressed, the UP/DOWN control shown in FIG. 14(b) is indicated. If the CTRL key is depressed, the UP/DOWN control shown in FIG. 14(c) is indicated.

FIG. 15 is a waveform chart for explaining the operation of the second preferred embodiment.

In the first preferred embodiment, correction waveform data is generated for the adjustment points corresponding to the screen as shown in FIGS. 8(a) through 8(d): i.e., for the image screen adjustment points during the active interval (trace interval) of the image display. Hence, the data maps from the EPROM 4 of FIG. 4, data from the EEPROM 6, and data from the data RAM 7 are employed corresponding to the total number of adjustment points (17×17).

On the other hand, in the second preferred embodiment, a number of adjustment points (e.g., three) are added during the horizontal blanking periods H. $BLK_A$ and H. $BLK_B$ that occur on either side of the active interval (ACTIVE) for smoothly carrying out interpolation operations during the blanking intervals so that corrections occurring between one active interval and the next are not visible on the screen (one of the three points in the blanking interval before the active interval H. $BLK_A$ being disregarded as it is in common with the interval H. $BLK_B$ of the previous frame). This makes the adjustment point matrix for the second embodiment 17×23. During the horizontal blanking intervals data from all memory areas may be used by the processing blocks (including adjustment points provided in the blanking intervals) to construct and output the correction waveform data. Interpolation is carried out substantially as in the previous embodiment.

In a case where the data is such that a large difference exists between the end of one active interval and the beginning of the next, as shown in FIGS. 16(a) and 16(b), data switching can be carried out during the period of the horizontal blanking intervals H. BLK as shown in an ideal correction waveform of FIG. 16(a). Furthermore, as shown in FIG. 16(b), in an actual waveform, if deformation or delay results because of passage through a low-pass filter 10, there is no disadvantage such as degradation of the active interval ACTIVE: i.e., there is no image distortion at the left and right edges of the image screen.

As the foregoing description makes clear, the corrected waveform generating apparatus according to the present invention has the following advantages:

(a) The calculation processing speed is increased so that adjustments can speedily and smoothly be carried out.

(b) Mere modification of the basic correction waveform data (data map) enables the performing of complex calculations such as square, cosine, and so on at a high speed through addition and/or subtraction operations whereby optimum correction waveform data is generated.

(c) Since the mere adjustment of the active interval of the image display (trace interval) automatically generates the continuous correction waveform data within the horizontal blanking interval, improved correction can be achieved at both the left and right sides of the image screen.

(d) Since the continuous basic correction waveform data is used for all intervals (blanking intervals) in addition to the trace interval, discontinuous points are not generated at left and right points on the image screen, even when the read timing of the digital data is modified.

It will be understood by those skilled in the art that the foregoing description is given in terms of the preferred embodiments and that various changes and modifications may be made without departing from the scope of the present invention, which is defined by the appended claims.

I claim:

1. Apparatus for generating correction waveform data for an image display, comprising:
   a memory storing previously calculated basic correction waveform data for each of a plurality of representative adjustment points of one quadrant of the image display, the number of said representative adjustment points being substantially less than the total number of adjustment points in one quadrant of the image display;
   means for reading out said representative adjustment points from said memory from four different starting points depending upon the quadrant of the image display being corrected; and
   calculation processing means including a work random access memory for adding or subtracting only to or from the basic correction waveform data at all of said adjustment points including the representative adjustment points on the basis of adjustment instructions pertaining to the respective representative adjustment points of each quadrant of the image display, thereby generating correction waveform data for use in forming said image display.

2. Apparatus as set forth in claim 1 wherein said image display is in color and is formed on a screen of a color television, further comprising means responsive to said correction waveform data for effecting convergence correction of said image display.

3. Apparatus as set forth in claim 1 wherein said image display is in color and is formed on a screen of a color television, further comprising means responsive to said correction waveform data for effecting focus correction of said image display.

4. Apparatus for generating correction waveform data z for digital convergence correction in a color television receiver, comprising:
   a commander for issuing commands selectively specifying adjustment items, moving one of representative adjustment points selected form a multiplicity of adjustment points on an image screen of the television receiver, or increasing or decreasing adjustment data determining the amplitude of a correction waveform at the representative adjustment points;
   a read only memory containing a data map in the form of previously calculated basic correction waveform data that was calculated using a predetermined equation for each of a plurality of representative adjustment points of one quadrant of the image screen;
   means for reading out the representative adjustment point data from four different starting points in the read only memory depending upon the quadrant of the image screen being corrected; and
   a processing unit for repeatedly carrying out only additions and subtractions for effecting waveform correction with respect to the representative adjustment points and other adjustment points respectively adjacent thereto as a unit in response to the commands and finally for generating correction waveform data with respect to remaining ones of the adjustment points; and
   a work random access memory for storing corrected waveform data relating to the representative adjustment points, the adjustment points respectively adjacent thereto, and the remaining adjustment points for all quadrants of the image screen.

5. Apparatus as set forth in claim 4 further comprising a digital convergence correction circuit having a data memory for receiving and storing correction waveform data derived from the work random access memory, a counter for reading the correction waveform data in synchronization with a horizontal and vertical synchronization signal, a digital-to-analog converter for converting the read correction waveform data into a stepped waveform, a low-pass filter for smoothing the stepped waveform, and an output amplifier connected to the low-pass filter; the data memory, digital-to-analog converter, lowpass filter, and output amplifier being individually selected in accordance with the specified adjustment items.

6. Apparatus as set forth in claim 5 wherein the output amplifier is connected to convergence controlling means of a cathode-ray tube installed in a television receiver.

7. Apparatus as set forth in claim 6 wherein said convergence control means is an electrostatic convergence plate.

8. Apparatus as set forth in claim 6 wherein said convergence control means is a magnetic convergence coil.

9. Apparatus as set forth in claim 4 wherein said predetermined equation is:

$$z' = (k-x)^2 (k-y)^2$$

where x denotes location along a horizontal axis of the image screen, y denotes location along a vertical axis of the image screen, and k is a constant, and wherein z' is stored as a data map and z is equal to az', a being a factor.

10. Apparatus as set forth in claim 9 wherein the data length of z is expanded by a predetermined amount and the calculation of az' is effected by a process wherein algebraic addition is substituted for multiplication.

11. Apparatus as set forth in claim 6 further comprising a mixing circuit and an input amplifier connected to receive an output from said mixing circuit wherein the data memory has two data random access memories into which the same correction waveforms are respectively written into the same addresses, the data of different lines on the image screen being alternatingly read out into respectively different digital-to-analog converters, the two digital-to-analog converters receiving triangular reference voltages having different phases with respect to each other, an interval between two apices of the reference voltages being equal to an interval of a horizontal scanning line and the output of the two digital-to-analog converters being transmitted to said mixing circuit.

12. Apparatus as set forth in claim 9 wherein the number of representative adjustment points is 3×3

(=9) in a quadrant of the image screen and the total number of adjustment points is 9×9 (=81).

13. A method of generating correction waveform data for an image display having an active interval and a blanking interval, comprising the steps of:

storing previously calculated basic correction waveform data for each of a plurality of representative points of only one quadrant of the image display that has adjustment points in all four quadrants;

adding or subtracting to or from the basic correction waveform data at all of said adjustment points in all four quadrants on the basis of adjustment instructions pertaining to the respective representative adjustment points by reading the stored calculated basic correction waveform data for said one quadrant from four different starting points, thereby generating correction waveform data for use in forming said image display;

using the correction waveform data during the blanking interval to adjust all of said adjustment points except the representative adjustment points already stored;

storing the basic correction waveform data on the adjustment points during the blanking interval; and preparing updated correction waveform data during the blanking interval.

* * * * *